UNITED STATES PATENT OFFICE.

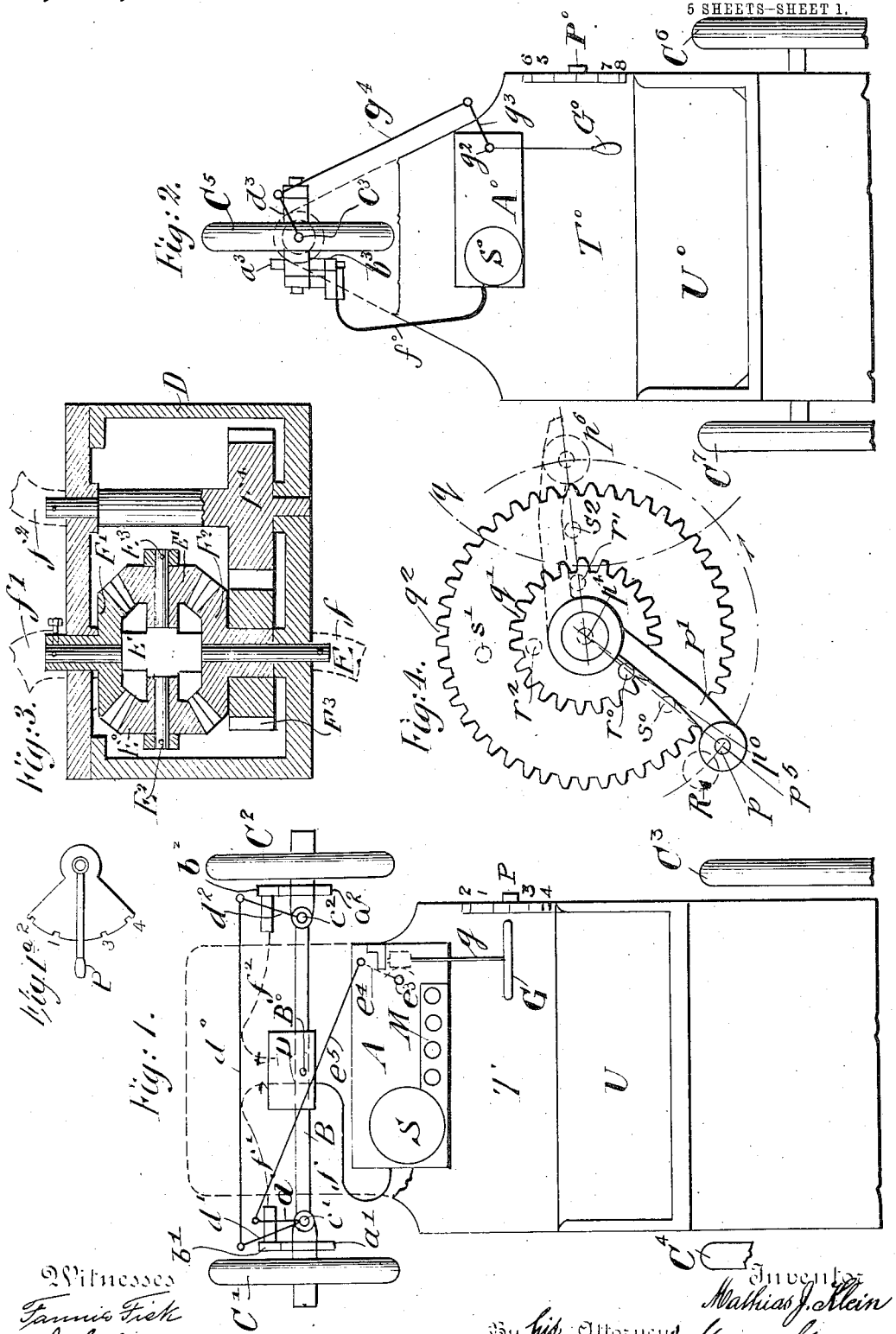

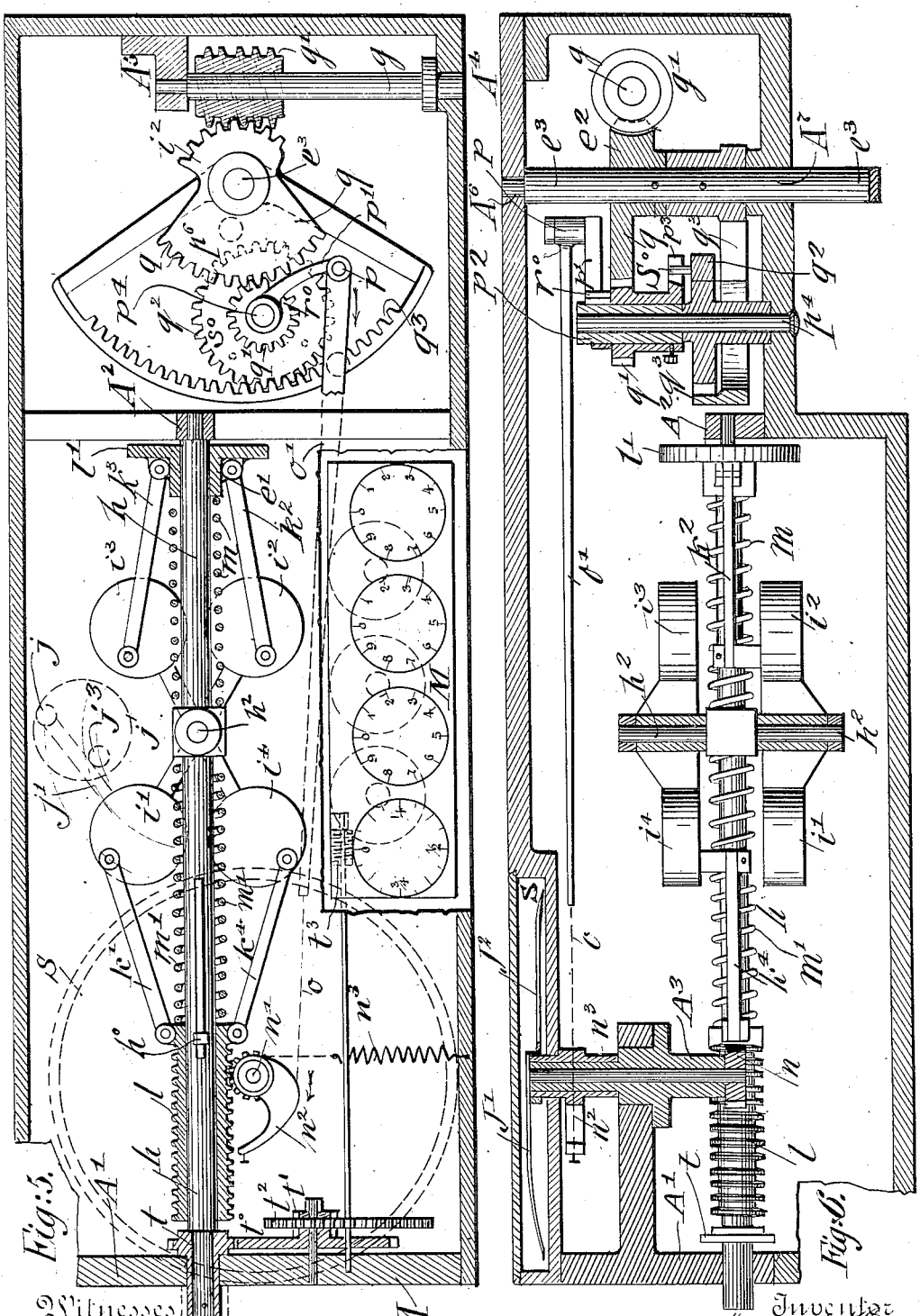

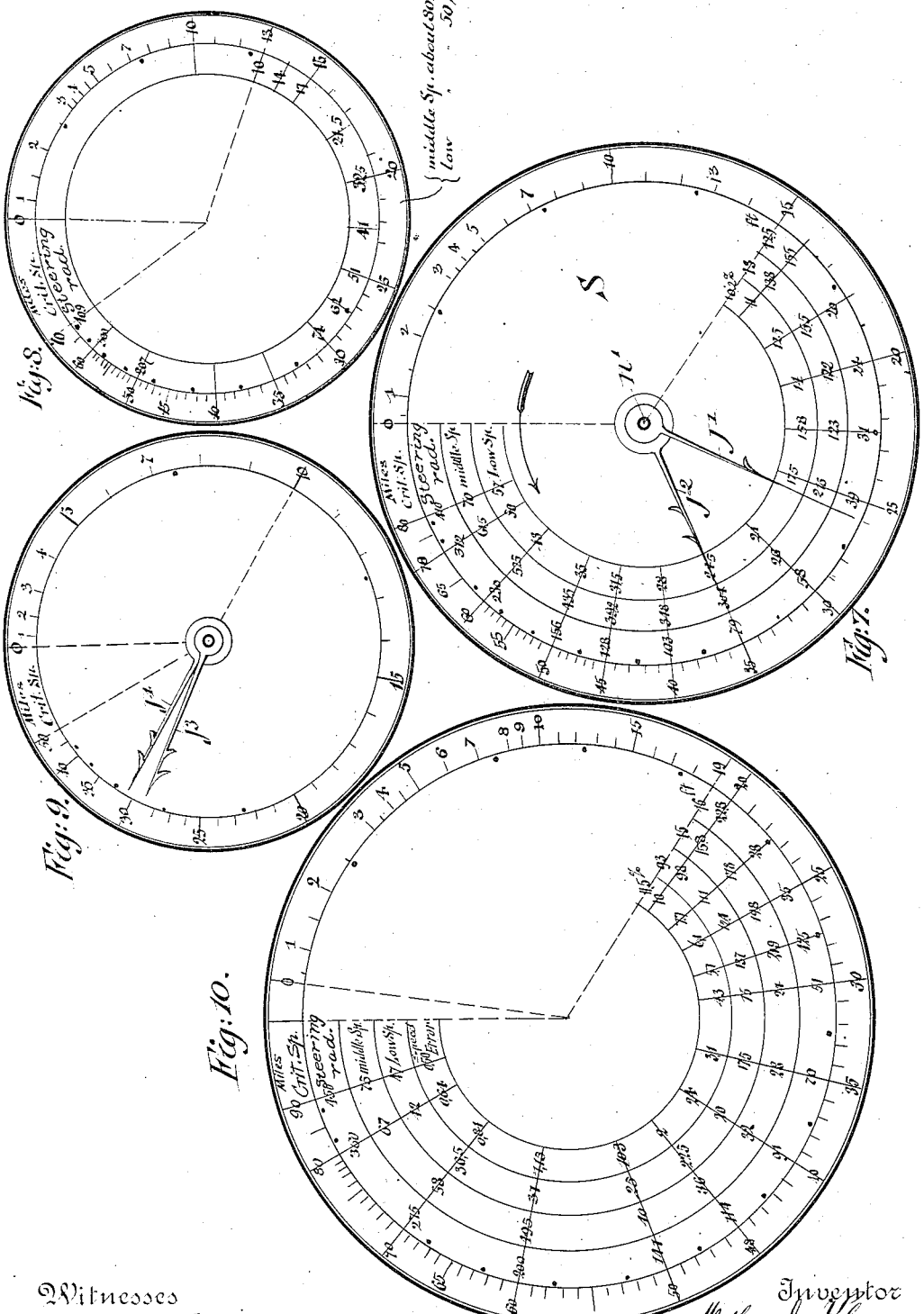

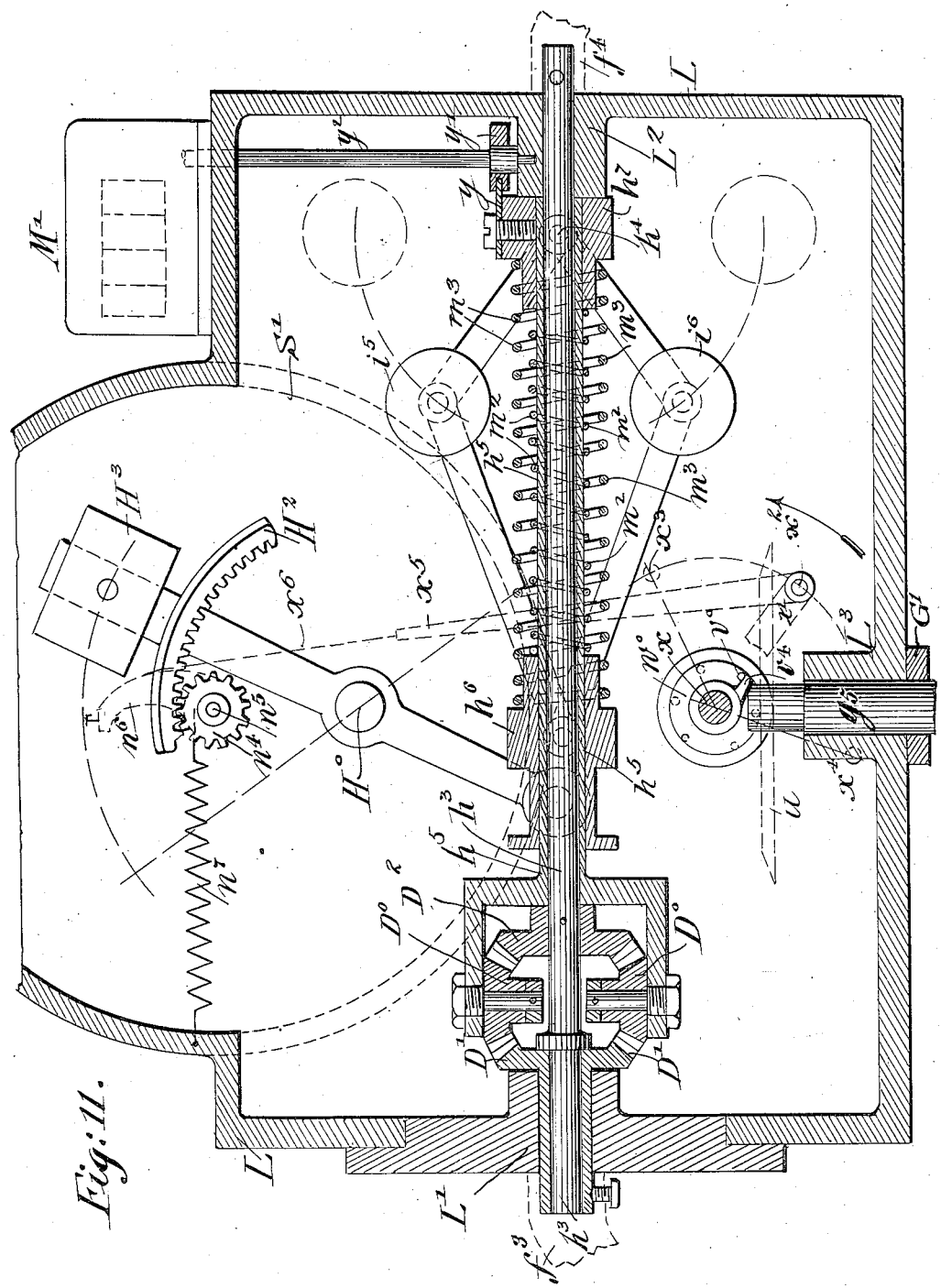

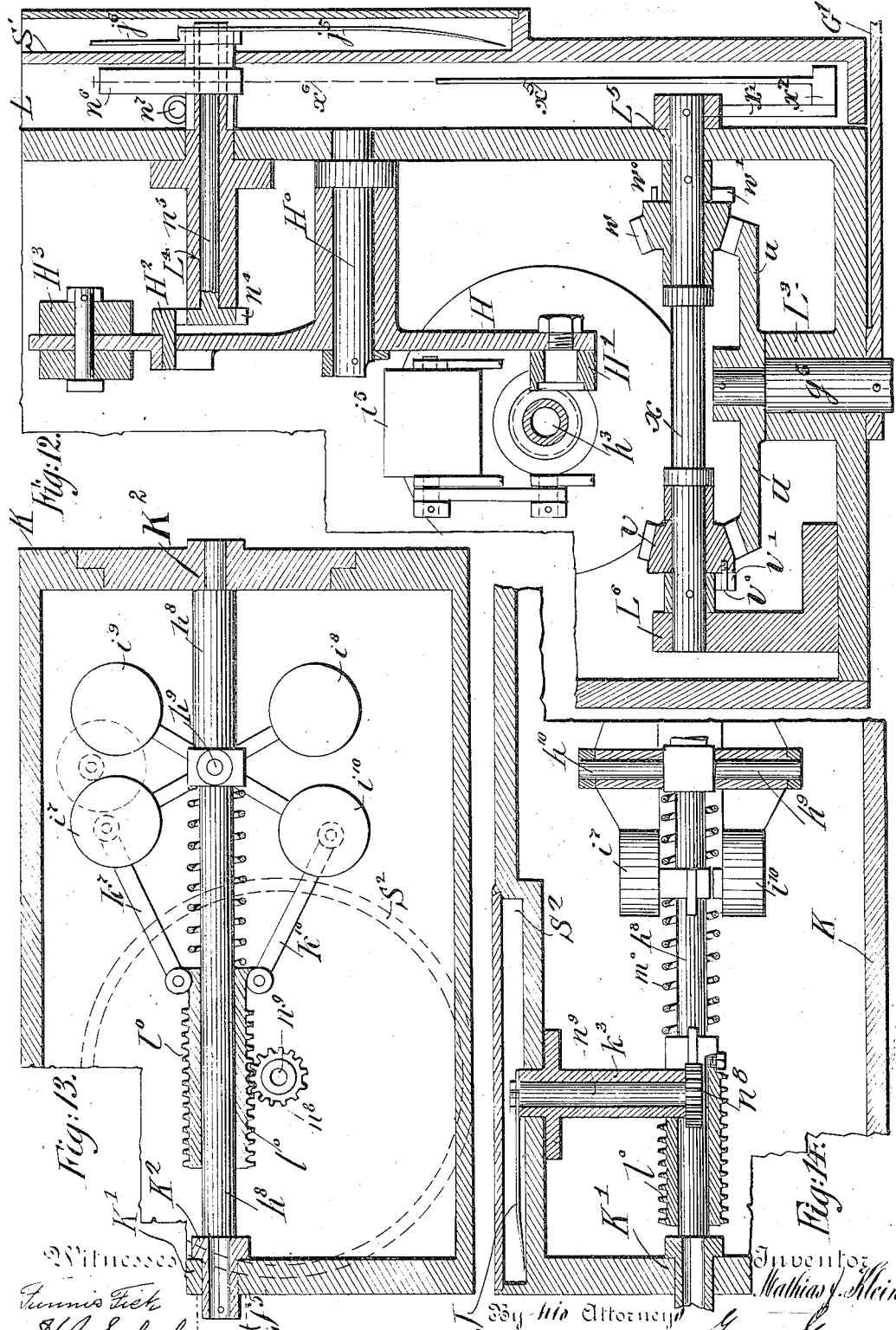

MATHIAS J. KLEIN, OF NEW YORK, N. Y., ASSIGNOR OF SIXTY ONE-HUNDREDTHS TO HUGO B. ROELKER, OF NEW YORK, N. Y.

MILE, SPEED, CURVE, AND DANGER INDICATOR.

1,101,079.  Specification of Letters Patent.  Patented June 23, 1914.

Application filed December 15, 1908, Serial No. 467,610. Renewed May 31, 1913. Serial No. 771,113.

*To all whom it may concern:*

Be it known that I, MATHIAS J. KLEIN, a citizen of the United States, residing in New York, borough of Manhattan, in the State of New York, have invented certain new and useful Improvements in Mile, Speed, Curve, and Danger Indicators, of which the following is a specification.

This invention relates to indicators for automobiles and motor vehicles having three or more road-wheels, its object being first to indicate the distance which the vehicle has traveled within a given time, second, to indicate at any movement the speed of the vehicle correctly whether moving in a straight line or in a curve to the right or to the left-hand side; third, to indicate at any moment the radius of the curve in which the non-skidding vehicle is moving; fourth, to indicate the critical speed of the vehicle when moving in a curve or circle; fifth, to indicate the danger speed of the turning vehicle; sixth, to indicate two additional speeds below this critical speed, for instance, such as the middle speed and the low speed, for enabling the vehicle-driver to reduce the power of the driving wheels properly when the vehicle is moved in curves at high relative speed, thereby preventing loss of power and injury to the tires of the driving wheels so as to increase the life of the latter, and lastly, to enable the vehicle driver to make the highest possible average speed for an automobile or other vehicle run within a given time or on a course of certain length without loss of power or injury to the tires or subjecting the vehicle to the danger of being turned over.

In the description of the invention, the motor-vehicle (having three or more road-wheels) has a power differential gear which divides the motor-power equally between the two driving wheels, and the center of gravity of the normally-loaded vehicle is at an equal distance from the side-wheels of the vehicle. Further the point on the axle of the two steering wheels, midway between them, (or in a vehicle with a middle road steering wheel, the center of the latter) is called the "steering center" of the vehicle. The speed-indicator of the apparatus gives the speed of the steering center of the vehicle, and the mile-indicator gives the distance traveled by the steering-center whether the vehicle is moving in a straight line or in curves; the radius of the curve or circle described by the steering center of a turning and non-skidding vehicle, is called the "steering radius" of the latter, shown by the so-called "curve and danger indicator"; in a turning and at the same time skidding vehicle, the radius of the curve described by the steering center, is larger than the corresponding steering radius. It is further noted that when the vehicle is turning on level ground in a curve of a fixed steering radius (by placing the steering lever or wheel in a fixed position), and no skidding takes place, and when there is no up and down motion of the vehicle-body on its springs, that the center of gravity of the loaded vehicle has its normal position, and when there is no wind-power acting on one side of the vehicle, in such a case the vehicle turns "under normal conditions"; but when one or more of said conditions are not present, it is said that the vehicle turns "under non-normal conditions."

When a motor-vehicle moves straight on level ground, the two driving wheels press on the ground with equal power; when said vehicle turns under normal conditions in a fixed curve (the latter having a certain steering radius) with a low degree of speed, the driving wheel on the inner side of said curve presses with somewhat less power on the ground than the driving wheel on the outer side of the curve, on account of the centrifugal force acting horizontally on the vehicle; when the vehicle-speed is then gradually increased by putting the maximum driving power on the driving wheels, said centrifugal force increases also and the inside driving wheel will press with still less power on the ground, and at a certain vehicle-speed, called subsequently the "low-speed" of the vehicle, said inside driving wheel commences to slip on the ground (the coefficient of friction between rubber-tires and ground having its average value), and may thereby increase considerably its speed of rotation over the speed of rotation of the other driving wheel on the outside of the curve; this means not only loss of power but a more or less quick destruction of the slipping rubber-tire, especially when the road is rough and stony; when said low speed is reached by the vehicle-speed, the said maximum driving power being reduced to its half value, then there will be no slipping of the inside driving wheel, but when the vehicle speed is further increased over low speed and a certain higher speed, the so-called "middle speed" of the vehicle is reached, said inside driving wheel will again commence to slip on the ground; the driving power of the vehicle being now reduced to zero, and the vehicle speed further increased (in the said fixed curve), until the whole vehicle weight (load included) rests on the outside side-wheels of the vehicle (the side-wheels on the inside curve touching only the ground without pressing on it), then the so-called "critical speed" of the vehicle is reached for said fixed curve having a certain steering radius with the vehicle still turning under normal conditions; when the vehicle speed is a little increased over critical speed, the vehicle will be turned over as is easily seen; while on account of the usual skidding of the vehicle which increases the steering radius of the turning vehicle and decreases the centrifugal force, the vehicle will, as a rule, not turn over until a more or less higher speed than critical speed is reached, said higher speed being called the "turn over speed" of the vehicle. When the latter is turning under normal conditions, said turn-over speed is equal to critical speed, but turning under non-normal conditions, the turn-over speed may sometimes be considerably higher than the critical speed for a fixed steering radius; the low speed, middle speed and critical speed for a certain steering radius are shown by the indicator-arrangement, but turn-over speed is not shown, as it is very variable. The middle speed and low speed are approximately in certain proportion to the corresponding critical speed; the latter increases, when the steering radius increases for a certain vehicle turning in a curve. Differently constructed vehicles may have the same, but as a rule have not the same critical speed for the same steering radius. The index-hand of the so-called "curve and danger-indicator" is connected with the steering arrangement of the vehicle, and indicates, steering radius, critical speed, middle speed and low speed of the turning vehicle; the vehicle-speed is shown by the index-hand of the speed-indicator, and when said vehicle speed reaches the critical speed (shown by the index-hand of the curve and danger indicator), then said vehicle-speed is called the "danger-speed" of the vehicle and both index-hands show the same speed.

For a turning vehicle, the value:

$$\frac{\text{Vehicle-speed}}{\text{Critical speed}} \times 100,$$

is called the "relative speed" of the vehicle; a motor vehicle moving at a relative speed of 25% means therefore, that the vehicle speed is 25/100 (that is ¼) of the critical speed for a certain steering radius; a relative speed of 100% means that a vehicle-speed is equal to a critical-speed, danger-speed is therefore equivalent to 100% relative speed. The turn-over speed is a relative speed usually of more than 100%. When a vehicle is moving straight, then its relative speed is always 0%. The described increase of the vehicle-speed from low speed to critical speed means always an increase of the relative speed up to 100%, but it means not necessarily an increase of the vehicle-speed; the latter may be kept constant and the steering lever or wheel so turned that the steering radius is lowered, whereby the critical speed is also lowered, so that the latter may be reached from low speed without increasing the speed of the vehicle; if the steering lever or wheel is kept in a fixed position, then of course the vehicle-speed must be increased in order to reach critical speed from low speed, and vice versa.

It follows from the foregoing that in order to prevent the slipping of the driving wheels on the ground, the maximum driving-power of the motor-vehicle (turning under normal conditions) ought to be reduced when low speed is reached, and when middle speed is reached only half (or less) of said maximum driving-power ought to be kept on the driving wheels, and when critical speed (100% relative speed) is reached, said driving-power ought to be reduced to nothing (or nearly so); said power reductions may be made gradually or otherwise; for short turns (curves of small steering radii) it is advisable to reduce the driving power directly to nothing when low speed is reached, because it takes only a short time to go through such curves. The reductions of power should be made on other speeds than low speed and middle speed, when the road is banked, or when a heavy wind is acting on one side of the vehicle, in other words, when the vehicle is turning under non-normal conditions, otherwise some slipping of one driving wheel may take place.

The critical speed of the vehicle for a certain steering radius, is the same, whether turning to the right or to the left-hand side, because the steering center and center of gravity have equal distances from the side wheels of the vehicle. The dials of the said curve and danger indicator and speed indicator may have different places on the motor-vehicle near the driver (chauffeur) but it is more convenient for the latter to have both dials combined into one dial (the so-called "combined dial"), so that both index-hands turn on one center and the scale of the speed-indicator is also the scale for the critical speed of the curve and danger indicator, because it simplifies very much (for the vehicle driver) the reading of the indicator-arrangement; when the vehicle reaches the critical speed (that is, when the vehicle moves at danger speed), both index-hands of the combined dial have the same position, and it is not necessary for the vehicle driver to read off any speed-figures to learn such a fact.

As long as the critical speed is only indicated by the index-hand of the curve and danger indicator, there is no danger for the vehicle, but when that same speed is also indicated (simultaneously) by the index-hand of the speed indicator, then said critical speed indication becomes a danger-speed indication and is more or less dangerous for the turning vehicle.

The invention consists in a distance, speed, curve and danger-indicator, which comprises the combination of a differential gear, of a speed-indicator of any design (a balanced speed-indicator of the centrifugal type being preferred) with a curve- and danger-indicator, the arrangement of a combined dial for the index-hands for the speed, and curve- and danger-indicator, a mile-indicator operated in connection with the speed-indicator and certain additional novel features of construction which will be fully described hereinafter.

In the accompanying drawings, Figure 1 is a plan-view of a four-wheeled motor vehicle provided with my indicator-arrangement, Fig. 1ª is a side-view of the hand-lever, Fig. 2 is a plan-view of a three-wheeled motor vehicle with a modified form of indicator, Fig. 3 is a detail horizontal section of the differential gear for transmitting the motion from the steering wheels to the speed indicator and to the mile indicator drawn on a larger scale, Fig. 4 is a detail top-view drawn on a larger scale of a portion of the curve indicator mechanism, Figs. 5 and 6 are respectively a horizontal section and a vertical longitudinal section of the mile, speed, curve and danger indicator, all arranged within one casing without the differential gear, Fig. 7 is a top-view of the combined dial for the arrangement shown in Fig. 1, said dial being provided with four scales and two index hands respectively for indicating the vehicle speed, the critical speed, the steering radius, the middle and low speed of the vehicle, and the danger-speed, Fig. 8 shows a simple form of the combined dial with two scales, Fig. 9 shows a still more simplified form of combined dial with one scale only, Fig. 10 shows a combined dial having five scales, Fig. 11 and 12 are vertical sections showing a modified construction of the indicator used upon a motor-vehicle without a middle road wheel having the differential gear arranged at the inside of the casing, and Figs. 13 and 14 are respectively a horizontal section and a vertical section of a modified construction of the balanced speed indicator.

Similar letters of reference indicate corresponding parts throughout the several drawings.

The motors of the automobiles shown in Figs. 1 and 2 are not shown, they may be of any approved construction for steam, electric, gasolene or any other motive power, the hand-levers P and P⁰ for regulating the power being shown in plan-view at the right hand side of the vehicle and in side view in Fig. 1ª, said levers being capable of being placed in different positions. When the lever is placed in zero-position, as shown in Figs. 1, 1ª and 2, there is no power acting on the driving-wheels, but when the lever is placed in position 1, Fig. 1, or 5, Fig. 2, the vehicle moves forward with one half the full driving power. When said levers are shifted to positions 2 and 6, Figs. 1 and 2 respectively, the full driving power of the motor acts on the driving wheels; by shifting the levers to positions 3 and 7 respectively, the vehicle moves backward with one half the power; and by shifting the levers to the positions 4 and 8 respectively, the full driving power of the motors acts to impart a backward motion to the driving wheels of the vehicles. It should be noted that the steering device used on the vehicles may be of any design; in Fig. 1, a wheel steering-gear is used, and in Fig. 2, a lever steering-gear.

On the body T of the vehicle shown in Fig. 1, in front of the seat U, is arranged the indicator-casing A, which is shown in detail in Figs. 5 and 6. The combined dial S of the speed, curve and danger-indicator and dials M of the mile-indicator are arranged in the top-part of the said casing.

$C^1$ and $C^2$, Fig. 1, indicate the front steering-wheels of the motor-vehicle; $C^3$ and $C^4$ are the driving wheels; B is the front-axle which is forked at its ends $c^1$, $c^2$. The wheel $C^1$, steering-knuckle $d^1$ and lever $d$ oscillate about the pivot $c^1$, and the wheel $C^2$ and the steering-knuckle $d^2$ oscillate about the pivot $c^2$ of the axle B. The rod $d^0$ connects the two knuckles $d^1$ and $d^2$. The lever $d$ is connected by a rod $e^5$, to a lever $e^4$, as shown in Fig. 1, the latter being connected to the lower end of the vertical shaft $e^3$ which turns in bearings $A^6$ $A^7$ of the casing A, Figs. 5 and 6, while the gear-segments $q$ and $e^2$ are connected to the shaft $e^3$. By moving the hand steering-wheel G on the shaft $g$, the latter having the bearings $A^4$, $A^5$, and worm $g^1$, in either direction, the worm-segment $e^2$ and lever $e^4$ oscillate about the shaft $e^3$, so that by means of the rods $e^5$ and $d^0$ and levers $d$, $d^1$ and $d^2$, the steering wheels $C^1$ and $C^2$ will turn about their pivots $c^1$, $c^2$ respectively, whereby the moving vehicle is steered in the desired direction. The point B⁰ which is midway between the steering road wheels $C^1$, $C^2$ is the steering center of the vehicle; the radius of the curve or circle described by this point in a turning and nonskidding vehicle is the steering radius of the latter; when the turning vehicle is "skidding" the radius described by the steering center $B^0$ is greater than the corresponding steering radius indicated by the instrument.

The toothed segments, $q$, $q^3$ connected with the shaft $e^3$ mesh with gear-wheels $q^1$, $q^2$, respectively, which are supported on the shaft $p^4$ as shown in Fig. 6. The gear-wheels $q^1$, $q^2$ oscillate in opposite directions at equal angles, because the radius of the toothed segment $q$ and the radius of the gear wheel $q^1$ are in the same proportion as the radius of the toothed segment $q^3$ to the radius of the gear wheel $q^2$.

The lever $p^3$ is connected with the hollow shaft $p^2$ of the lever $p^1$, and a gear-wheel $q^1$, (which is provided with a pin $r^0$) is mounted on the hollow shaft $p^2$, the latter moving loosely on the shaft $p^4$, as shown in Figs. 4, 5 and 6. The wheel $q^2$ is likewise provided with a pin $s^0$, as shown in Fig. 6 and on a larger scale in Fig. 4. To the crank-pin $p$ of the lever $p^1$ is pivoted a connecting rod $o^1$, the end of which is again connected by means of a chain $o$ with a cam $n^2$, as shown in Figs. 5 and 6, while a spring $n^3$ connecting the cam and the casing tends to turn said cam and the crank-pin $p$ in the direction of the arrow, as shown in Fig. 5. To the hollow shaft of the cam $n^2$ is attached the curve index-hand $J^2$ of the curve and danger-indicator. When the vehicle moves in a straight line, the pins $r^0$, $s^0$ assume the positions shown in Fig. 4, while the spring $n^3$ pushes the levers $p^1$, $p^3$ against said pins and the index-hand $J^2$ points to zero. By turning the vehicle to the extreme right (shortest turn) the pin $s^0$ moves to positions $s^1$, Fig. 4 and the pin $r^0$ to the position $r^1$, and $r^0$ pushes thereby the lever $p^1$ with the crank pin $p$ from the position $p^4$, $p^5$ to $p^4$, $p^6$ and by means of the connecting rod $o^1$, chain $o$ and the cam $n^2$, the index-hand $J^2$, is moved from zero in the direction of the arrows, Fig. 7. The index-hand $J^2$ makes exactly the same turn when the vehicle is turned from a straight course to the extreme left, because the pin $s^0$, by moving to position $s^2$ pushes the arm $p^3$ and thereby the lever $p^1$ and the pin $p$, from $p^4$, $p^5$ to $p^4$, $p^6$, while the pin $r^0$ moves to the position $r^2$. The toothed segment $q$ is indicated in Fig. 4 by a dotted line.

The spring $n^3$ allows of no play between the steering wheel and the curve index-hand $J^2$. To any fixed position of the steering wheel G a fixed position of the curve index-hand $J^2$ always corresponds and indicates thereby on the outer circle (called the first scale) of dial S, Fig. 7, the critical speed of the vehicle, and on the inner circles thereof the steering radius of the curve in which the non-skidding vehicle moves, the middle speed and low speed of the vehicle.

The gear-wheels $a^1$, $a^2$, Fig. 1 connected to the hubs of wheels $C^1$, $C^2$ respectively transmit their rotary motion to the gear wheels $b^1$ $b^2$, the bearings of said gear wheels being connected to the steering knuckles $d^1$, $d^2$ respectively; the flexible shaft $f'$ is connected at one end to the shaft of gear wheel $b^1$ and at the other end to the hollow shaft of the beveled gear wheel $F^1$ of differential gear D, as shown in Fig. 3.

The flexible shaft $f^2$ is connected at one end to the shaft of gear wheel $b^2$ and at the other end to the shaft of gear wheel $F^4$, the latter meshing with the gear-wheel $F^3$ of equal diameter. Gear wheel $F^3$ is connected to the beveled gear wheel $F^2$, the four beveled gear wheels $F^1$, $F^2$, $E^0$, $E^1$ rotate loosely on the shaft E, E and counter-shaft $E^2$, $E^3$. Gear wheels $F^1$, $F^2$ are called in the following the two "side-wheels" of the differential D and move in the same direction with equal speed when the vehicle is moving in a straight line, but with uneven speed when the vehicle moves in a curve, (in the latter case the wheels $C^1$, $C^2$ have different speeds). The cross-shaft $E^2$, $E^3$ with gear-wheels $E^0$, $E^1$ and revolving shaft E is called the middle wheel mechanism or "middle wheel" of the differential D. It makes the average turns of the side-wheels $F^1$, $F^2$, and transmits its motion by means of the flexible shaft $f$ to the revolving shaft $h$ of the balanced speed indicator. It is obvious that the speed of the shaft $h$ is always proportionate to the vehicle speed, that is the speed of the steering center $B^0$, Fig. 1, whether the vehicle moves in a straight line or in a curve to the right or to the left because the speed of $B^0$ is the average of the speeds of the wheel center $C^1$ and $C^2$.

The shaft $h$ of the balanced speed-indicator rotates in bearings $A^1$, $A^2$ and is provided with a cross-shaft $h^2$ around which two sets of bars $K^1$, $K^2$, $K^3$ and $K^4$, and fly-balls $i^1$, $i^2$ and $i^3$ and $i^4$ oscillate in opposite directions and at equal angles. The balls which are of equal weight are shown as made of cylindrical shape, but it is obvious that they may be of any other shape. On the shaft $h$ are arranged two main-springs $m$, $m^1$, which tend to bring the fly-balls in proximity to the shaft $h$ by means of the connecting bars $k^1$, $k^4$, $k^2$, $k^3$ all of equal weights, and sleeves $l$, $l^1$ on the shaft $h$. The sleeves $l$, $l^1$ are provided with ears at diametrically-opposite points for engaging the connecting bars $k^1$, $k^4$, $k^2$, $k^3$, as shown in Fig. 5. The sleeve $l$ which is prevented from turning about the shaft $h$ by means of a screw $h^0$ and a slot in the shaft, is provided with an exterior ring-shaped rack, which acts in the nature of a ring gear-wheel and meshes with a gear-wheel $n$ on the shaft $n^1$ the latter turning in bearing $A^3$. The speed index-hand $J^1$, which is applied to the upper end of the shaft $n^1$ above the dial $S$ is thereby moved over the dial, its weight being balanced in regard to the shaft $n^1$. The helical spring $m$ is weaker than the spring $m^1$ so as to act from zero on the dial. The spring $m^1$ is not called into action from zero up to a certain speed (say three miles per hour) and then for all higher speeds above this speed the spring $m^1$ acts in conjunction with the spring $m$. The centrifugal force of the fly-balls is therefore resisted from zero to say three miles by the spring $m$, and then for all speeds above three miles per hour by both springs $m$, $m^1$. For very high speeds, the fly-balls $i^1$, $i^3$ assume nearly the position $j$ shown in Fig. 5, while the ends of their connecting bar $k^1$, move up to the position $j^1$, shown in dotted lines in Fig. 5. The fly-balls and the link-pins thereon are so arranged as not to interfere with each other even when revolving at very high speed.

On the end of the shaft $h$, adjacent to its connection with the flexible shaft $f$ is arranged a gear-wheel $t$, which sets the intermediate gear-wheels $t^0$, $t^1$, $t^2$ and worm-wheel $t^3$ in motion, the latter moving the set of gear-wheels of the mile-indicator M and the index-hands for the dials of the same, thereby indicating the correct distance traveled by the vehicle, whether the same goes in a straight or curved line. The mile-indicator M is made of any approved construction, the miles being indicated by the index-hands on the stationary dials M.

The sleeve $l^1$ is of sufficient weight so that $l^1$ and $m$ balance $l$ and $m^1$ in regard to point $h^2$. The center of gravity of the fly-balls $i^1$, $i^4$ including $k^1$, $k^4$, $l$, $m^1$ remains always in the axis of the shaft $h$ for all speeds, and such is the case with the center of gravity of $i^2$, $i^3$, $k^2$, $k^3$, $l^1$, $m$; the latter center of gravity balances the former one at all speeds perfectly (or nearly so), in regard to point $h^2$ (Fig. 5), and therefore different positions of shaft $h$ and vehicle shocks will not influence the indications of said speed indicator. By the construction herein described, large fly-balls may be used and the speed-indicator be rendered very sensitive to small speed differences, its range of action being considerably increased by the use of the two main-springs $m$, $m^1$. The U. S. patent for said balanced speed-indicator was issued Feb. 27, 1912, No. 1,018,504.

The outermost circle, the first scale of the combined dial, Fig. 7, indicates the vehicle-speed from zero to 80 miles per hour by the speed index-hand $J'$, and at the same time the critical speed of the vehicle from fifteen miles to 80 miles by the curve index-hand $J^2$, for which purpose the cam $n^2$ (Fig. 5) must be properly shaped. The next interior circles (the second, the third and the fourth scale) indicate the steering, middle speeds and low speeds respectively of the vehicle, which are also indicated by the index-hand $J^2$. The "danger speed" of the vehicle is indicated by both index-hands, whenever they have the same position on the combined dial, that is to say, when the vehicle-speed reaches the critical speed of the vehicle. When the vehicle is started forward in a straight line, both index-hands $J^1$, $J^2$ are in a zero position. As the speed of the vehicle increases, the speed index hand $J^1$ moves accordingly and indicates at any moment the speed of the vehicle, but the curve index-hand $J^2$ remains in its zero position as long as the vehicle is moving in a straight line. As soon as the steering wheel G is turned so that the vehicle turns in a certain direction, say in a curve of 410 feet radius, then the curve index-hand $J^2$ moves from zero to 80 in the direction of the arrow shown in Fig. 7, thereby indicating the steering radius of 410 feet, a critical speed of 80 miles, a middle speed of 70 miles and a low speed of 57 miles, provided the vehicle turns under normal conditions, in other words the vehicle speed could be raised on level ground up to the critical speed of 80 miles before the vehicle would be turned over, the index-hand $J^1$ would move up to 80 and assume the same position as the curve index-hand $J^2$, said hands showing thereby "danger-speed", and then the critical speed of the vehicle would be reached by the vehicle speed; said danger speed would also in this case be the "turn-over speed" of the vehicle; but as there is nearly always more or less "skidding", which increases the curve radius, the turn-over speed would be higher than 80 miles; on account of the irregularity of the skidding, however, it would be more or less dangerous to increase the vehicle-speed over 80 miles while curve hand shows 410 feet, or to decrease the steering radius below 410 feet, while the speed hand indicates 80 miles vehicle-speed. When the latter is reduced to say 26 miles per hour and the vehicle is turning under non-normal conditions to the right or left so that the index-hand $J^2$ shows a steering radius of say 79 feet, a critical speed of 35 miles, a middle speed of 30.4 miles and a low speed of 24.5 miles, then the curve made by the vehicle would have a radius of 79 feet or more and there would be no danger whatever of the vehicle being turned over, because the relative speed of the vehicle is only $$\frac{26}{35} \times 100 = 75\%;$$

but as the vehicle-speed of 26 miles is higher than the low speed of 24.5, it would be advisable to have the power-lever P, if it should stand at the full power mark 2, Fig. 1, shifted to the position 1 (which is the one-half power-mark) or to a place between 1 and 2, as otherwise some slipping of the inside power-wheel will take place. When the vehicle-speed is reduced to 24 miles, which is below the low speed of 24.5 miles, then the power-lever may be shifted to the full power mark 2; but when the vehicle speed ($J^2$ being still at 35) is increased to 32.5 which is more than the middle speed of 30.4, then the power-lever P should be shifted to zero or to a point between zero and 1; the relative speed is now $$\frac{32.5}{35} \times 100 = 93\%;$$

if the vehicle "skidding", road-banking, etc., should amount to 5%, that is if the turn-over speed in this case should be 105% relative speed then the relative vehicle-speed 93% could be still further increased by 12% (or the vehicle-speed could be raised from 32.5 miles to 36.75 miles) before the vehicle would be turned over; but if under the same conditions the road would be banked 20% on the inside of the curve, which would lower the turn-over speed about 10%, from 105% to 95% relative speed, then 32.5 miles vehicle speed (93% relative speed) would be a very dangerous speed for the vehicle, as it would be close to turn-over speed. On the other hand, if 20% road banking should be on the outside of the curve, the "turn-over" speed would be increased from 105% to 115% relative speed (about 40 miles vehicle speed), so that 32.5 miles and even 35 miles speed of the vehicle would be quite safe. In the foregoing, and also in the following, it is assumed that the radius of the "vertical road curve" (the latter is obtained by a vertical section in the road direction) in which the vehicle is moving is one mile or more, in which case its influence on the curve and danger-indicator is very small.

Instead of increasing the vehicle speed (vehicle moving in a curve of a fixed steering radius), to low speed, middle speed and critical speed (shown by the curve index-hand $J_2$, Fig. 7), the vehicle speed may be kept constant (say for instance 35 miles), and the steering radius decreased, first to 156 feet, then to 105 feet, and at last to 79 feet; 35 miles vehicle speed is the low speed of the curve having a steering radius of 156 feet, the middle speed of the 105 feet curve, and the critical speed of the 79 feet curve, as shown in the 4th, 3rd and 2nd scale of Fig. 7; 156 feet steering radius may therefore be regarded as the low steering radius or the "low radius" of the 35 miles vehicle speed; 105 feet steering radius may be regarded as the middle steering radius or the "middle radius" of the 35 miles vehicle speed, and the 79 feet steering radius may be regarded as the critical steering radius or the "critical radius" of said 35 miles vehicle speed; therefore, (vehicle moving at a speed of 35 miles), when the curve hand $J_2$, Fig. 7, comes to the 156 feet curve (the low radius of 35 miles vehicle speed), the vehicle moves at low speed, (or the latter is reached by the vehicle speed), and when $J_2$ comes to the 105 feet curve (the middle radius of the 35 miles vehicle speed), the vehicle moves at middle speed, and when at last $J_2$ comes to the 79 feet curve (the critical radius of said 35 miles vehicle speed), the vehicle moves at critical speed, and $J_1$ and $J_2$ (having the same position on the combined dial), show danger speed.

In order to simplify the scale arrangement of the combined dial S, the scales for the middle and low speeds may be omitted, as shown in Fig. 8, in which the index-hands, however, are not shown. Here two scales only are used, the scale for the vehicle-speeds (which scale is, above thirteen miles, also the scale for the critical speeds), and the scale for the low radii. This scale for the low radii is also omitted in the combined dial shown in Fig. 9, in which only one scale is used, on which the speed index-hand $J^3$ indicates the vehicle speed and the other index-hand $J^4$ above 10 miles the critical speed. Fig. 9 shows the simplest form of combined dial arrangement before described. The dial shown in Fig. 10 shows five scales, four of them corresponding to those shown in Fig. 7, and an additional scale called the "speed error scale." The latter, however, is only used when no differential gear is employed for the speed-indicator in a motor vehicle without a middle road wheel, and in which the speed indicator receives its motion from one side-road wheel only. For straight lines, the curve hand stands at O and the indications of the mile and speed indicators are correct, but not for curves. They are either too small or too large when turning one or the other way. The difference is called "speed error," it being positive or negative, and is shown in percentage upon the innermost scale (the fifth scale of the combined dial) by the curved index-hand. This "speed error" is to be added to or subtracted from the corresponding speed shown by the speed hand in order to obtain the correct vehicle speed. Exactly the same correction must be made on the distance indication shown by the mile or distance indicator, in order to get the correct distance traveled by the vehicle, when the latter moves many times around a curve or circle always in the same direction. The indications of the curve index-hand on the four outer scales, Fig. 10, are always correct, and have the same meaning as in the dial shown in Fig. 7. The "speed error" scale can also be used with the dials shown in Figs. 7, 8 and 9, when no differential gear is used for the speed indicator in a motor vehicle without a middle road wheel. In this case the critical speed is reached when the speed hand stands somewhat before or behind the curve-hand, and not as before, when both hands have the same position; for instance, when the curve-hand shows 35 miles critical speed and the speed indicator receiving its motion from the left hand vehicle wheel, then the critical speed is reached when the speed hand shows 36.1 miles (the vehicle turning to the right say 70 feet steering radius), because 3.1% (speed error) subtracted from 36.1 leaves 35 miles; when turning to the left and the speed hand shows 33.9 miles, the critical speed of 35 miles is reached also because 33.9+3.1% of 33.9=35 miles; therefore, the Fig. 10 arrangement shows no danger speed when speed-hand shows 17 miles, (vehicle turning to the left, the curve-hand showing 35 critical speed) the real vehicle speed is 3.1% more, that is about 17.5 miles, and therefore low speed is reached.

If a four-wheeled motor-vehicle without a differential gear is provided with such an indicator arrangement, and having a combined dial Fig. 10, (speed-indicator receiving its motion from the left-hand side road-wheel), would move in a small circle of 23 feet radius to the right, its speed and distance indications would be 10% too high, and 10% too low when going in the opposite direction, a total difference of 20%, (said difference of course decreases as the radius of the curve increases), its combined dial would not show danger speed; but if said four-wheeled vehicle is provided with a differential gear as above described, or an equivalent arrangement, it would show danger speed, and speed and distance indications would be always correct (that means the same), when going in one or the other direction through a curve of a certain radius and length in the same time.

The curve hands of the combined dials shown in Figs. 7 and 10 move whenever the steering - lever or wheel is moved. The lever $p^1$ (Fig. 4) with crank - pin $p$ makes the full swing from $p^4$, $p^6$ to $p^4$, $p^5$, but in the curve-hand movement for Figs. 8 and 9, a fixed pin R prevents the crank pin $p$ from making the full swing from $p^6$ to $p^5$, as it can only swing from $p^6$ to $p^0$, and consequently the curve-hand is at rest for very large curve radii. In Fig. 8, the curve-hand stops at 70 and does not show curves over 409 feet radius. In Fig. 9 the curve-hand stops at 50; it does not show any critical speed above 50 miles. A motor vehicle moving in a straight line will usually have a tendency to skid slightly to the right or left; in order to keep the vehicle in its straight course, the vehicle driver must make small oscillations with the steering-lever or wheel near its zero position. The pins $r^0$ and $s^0$ (Fig. 4) are therefore nearly continually contacting with the levers $p^1$ and $p^3$, and these parts will wear off more or less quickly; if the fixed pin R is used friction is obviated in a great degree and so the pins $r^0$ and $s^0$ and levers $p^1$, $p^3$ will be more durable. For low speed automobiles, pin R, Fig. 4 should be used because in this case high critical speeds need not be shown by the curve index-hand, but for high speed vehicles the pin R may be dispensed with.

The speed-indicator of the arrangement with combined dial, Fig. 9, has only one main spring of middle strength, and as a result the scale-divisions are large in the middle-portion and very small for very low and very high vehicle speeds and it is difficult to read a part of these speeds. If a weak main spring is used alone, the fly-balls move up quickly and nearly reach their extreme positions by even moderate speed; the scale-divisions are large for low speeds, small for middle speeds, and very small for high speeds it being nearly impossible to read off the latter; if the one main spring is a strong one, it is nearly impossible to read off the low speeds, but if a weak main spring is combined with one or more stronger ones these scale-divisions become more uniform and low and high speed may be read with facility. In other words, the range of action of the speed indicator is considerably increased. Figs. 7, 8 and 10 illustrate this clearly. The balanced speed indicators for the combined dials shown in Figs. 7 and 8, are provided with the two main-springs (a weak one and a strong one) before described. The speed indicator for the combined dial shown in Fig. 10 is provided with three main springs, one spring, a weak one, acting when the speed is below say three miles, one, a stronger one acting from three to eight miles in conjunction with the first named spring and above eight miles all three of the springs act in conjunction.

In a three-wheeled vehicle, such as is shown in Fig. 2, the speed, curve and danger-indicator with its combined dial $S^0$ is placed on the vehicle-body $T^0$ in front of the seat $U^0$; $C^6$, $C^7$ indicates the driving wheels. The hand steering lever $G^0$ operates shaft $g^2$, lever $g^3$, rod $g^4$ and lever $d^3$ and turns the steering wheel $C^5$ around the steering center $c^3$. The oscillations of the shaft $g^2$ cause the curve index-hand to move over the dial $S^0$ in the same way as in the arrangement before described. The gear-wheel $a^3$ on the hub of the steering-wheel $C^5$ rotates the pinion $b^3$ and by means of the flexible shaft $f^0$ the speed indicator shaft which is located in the casing $A^0$. No mile indicator is shown in this case but the combined dial $S^0$ has two index-hands like the dial S in Fig. 1. Usually no differential gear D is required for the speed indicator of a motor vehicle with a middle road wheel. The wheel $C^5$ (the middle road-wheel of the three-wheeled motor-vehicle Fig. 2), always transmits correct speed to the speed indicator when the vehicle is moving in either straight lines or in curves to the right or to the left. The power-lever $P^0$ is set for middle and low speeds in the same way as the lever P in Fig. 1. The combined dial $S^0$ has four scales like Fig. 7; but it may have only 2 scales as shown in Fig. 8, or only one scale as shown in Fig. 9.

A modified construction of the mile, speed, curve and danger indicator is shown in Figs. 11 and 12. In this case the whole indicator arrangement including the differential gear for the speed indicator, is arranged inside the same casing L. Shaft $h^3$ with bearings $L^1$, $L^2$ is connected to the bevel gear wheel $D^2$, but the gear $D^1$ with its hollow shaft rotates loosely on the shaft $h^3$, the two flexible shafts $f^3$, $f^4$ receiving motion from the gear wheels on the hubs of the steering wheels and transmitting it to the side wheels $D^1$, $D^2$ respectively of the differential gear, thence to the middle wheel $D^0$ of said differential gear, then through the hollow shaft $h^5$ to ring $h^7$ and to the two fly balls $i^5$, $i^6$ which oscillate around the cross-shaft $h^4$ and shift the sleeve $h^6$, pressing the two helical main-springs $m^2$, $m^3$ which are located one within the other, the inner spring $m^2$ (the weaker one) acting for low speeds while for higher speeds both act together as hereinbefore described. The lever H which is pivoted to the stationary pivot $H^0$ receives its motion from sleeve $h^6$ and roller $H^1$ and moves the toothed segment $H^2$ which engages with pinion $n^4$ on the shaft $n^5$ so as to set the speed index-hand $J^5$, as shown in Fig. 12. The weight $H^3$ on the fulcrumed lever H serves to balance the fly-balls $i^5$, $i^6$ in regard to point $h^4$ of shaft $h^3$, and therefore, vehicle shocks and different positions of the shaft $h^3$ have no influence on the indications of the index-hand $J^5$. The bevel-gear wheel $u$ and the steering lever $G^1$ are connected to shaft $g^5$, which rotates in a bearing $L^3$, and the lower end of said shaft is connected to the steering knuckles in the usual way. The gear wheel meshes with the two bevel gear wheels $v$ and $w$, which rotate loosely on the shaft $x$ having bearings $L^5$, $L^6$, said gears being provided with pins $v^0$ and $w^0$ respectively; lever $x^1$ (having crank pin $x^2$) and the levers $v^1$, $w^1$ are connected to shaft $x$, as clearly shown in Fig. 12. By shifting the steering lever $G^1$ (only partially shown) in either direction, the motor vehicle is steered, the oscillations of wheel $u$ being transmitted to the pins $v^0$, $w^0$, which oscillate always in opposite directions. The spring $n^7$ connecting the casing and the hollow shaft of cam $n^6$ tends to move the crank pin $x^2$ by means of a rod $x^5$ and chain $x^6$ in the direction of the arrow, Fig. 11. When the vehicle moves in a straight line, the curve index-hand $J^6$ connected to the hollow shaft of cam $n^6$ has the position O upon combined dial $S^1$. The two levers $v^1$, $w^1$ are in contact with the pins $v^0$, $w^0$, and the crank pin $x^2$ is in position $x^3$. When the vehicle is steered to the extreme right, the pin $v^0$ pushes the lever $v^1$ and thereby crank-pin $x^2$ from $x^3$ to $x^4$, and when steered to the extreme left, the pin $w^0$ pushes lever $w^1$ and thereby $x^2$ from $x^3$ to $x^4$, and by means of $x^5$, $x^6$, and $n^6$, the curve hand $J^6$ from $o$ position to the shortest turn-position. The dial $S^1$ is arranged as shown in Fig. 7, or Fig. 8, or Fig. 9; the curve hand $J^6$ indicates the critical speeds of the vehicle on the same scale, on which speed hand $J^5$ indicates the vehicle speed, and in order to accomplish this, the cam $n^6$ must be properly shaped. The gear $y$ connected to ring $h^7$, moves gear $y^1$ and shaft $y^2$, and the latter moves the wheels of the mile or distance indicator $M^1$, which indicates the distance traveled by the vehicle. If the vehicle is a three-wheeled motor vehicle having a middle road wheel, then the differential ($D^0$, $D^1$, $D^2$) is omitted and shaft $h^3$ receives its movement only from one flexible shaft $f^4$, which is connected to the middle road wheel.

Figs. 13 and 14 show a modification of the balanced speed-indicator with one main spring only. Revolving shaft $h^8$ (having the bearings $K^1$, $K^2$) is moved by flexible shaft $f^5$, which is connected at its other end to the middle wheel of a differential gear, like that shown in Figs. 1 and 3, or to one vehicle wheel only, as shown in Fig. 2. Cross shaft $h^9$, $h^{10}$ is connected to revolving shaft $h^8$, and the two pairs of fly-balls $i^7$, $i^8$ and $i^9$, $i^{10}$, oscillate around the shaft $h^9$, $h^{10}$ in opposite directions and at equal angles. The main spring $m^0$ which resists the centrifugal force of the fly-balls moves the ring gear-wheel $l^0$, which, by intermeshing with the pinion $n^8$ on the shaft $n^9$, operates the speed-indicator hand J and moves the same over the dial $S^2$. The two balls $i^8$, $i^9$ are larger than balls $i^7$, $i^{10}$, so that they balance not only the weights $i^7$, $i^{10}$ in regard to point $h^9$ of shaft $h^8$, but also the helical spring $m^0$ and the ring-gear-wheel $l^0$ and the pivot-links $k^7$, $k^{10}$.

As a speed-indicator for the complete indicator arrangement, I prefer a balanced one, as described and shown above; but any other construction may be used. Instead of differential D (for the speed-indicator, shown in Fig. 3 in a larger scale), its equivalent may be used.

The mile or distance indicator, which may be of any design, always gets its movement from the middle wheel of said differential gear or from the revolving shaft of the speed-indicator.

The curve index-hand of the curve and danger-indicator always receives its movement from the steering-lever or wheel, either in one of the ways shown in the drawings, or in any other equivalent way.

It follows from the foregoing, that the speed and distance indicator of a motor-vehicle having no middle road-wheel (for instance a four-wheeled motor-vehicle), must be provided with a differential gear, in order to show always correct speed and distance (that means to show the same speed and the same distance), when the vehicle is going through a curve of a certain radius and length, in one or the opposite direction in the same time.

While the complete indicator arrangement, having four scales on the combined dial, may be used on any horseless vehicle of three or more road wheels, the modified indicator arrangement, having only two (or one) scales on the combined dial (middle speed and low speed being omitted), may be used on any vehicle of three or more wheels, whether the vehicle is moved by a motor or by horse power.

Having thus described my invention, I claim as new and desire to secure by Letters Patent:

1. In an indicator arrangement of the character described, the combination of a speed index-hand movable relatively to the speed of the vehicle, a second or curve index-hand pivotally movable on the same axis as the speed index-hand and movable relatively to the curve in which the non-skidding vehicle is moving, means for shifting the speed index-hand, and means for shifting the curve index-hand.

2. In an indicator arrangement of the character described the combination, with the road wheels and steering device of a motor vehicle, of a speed index-hand, and a curve index hand pivotally movable on the same axis, means operatively connected with the rod-wheels and the speed index-hand for causing the speed index-hand to shift to indicate the speed of the vehicle, and means operatively connected with the steering device and the curve index-hand for causing said curve index-hand to shift to indicate the position of the steering device.

3. In an indicator arrangement of the character described the combination, with the road-wheels and the steering device of a motor-vehicle, of a dial having a scale, a speed index-hand and a curve index-hand movable over said scale, means operatively connected with the road-wheels and the speed index-hand for causing said speed-index-hand to shift to indicate the vehicle speed on said scale, and means operatively connected with the curve index-hand and the steering-device for causing said curve index-hand to shift over said scale to indicate the critical speed of the vehicle for each position of the steering device.

4. In an indicator arrangement of the character described the combination, with the road-wheels and the steering device of a motor-vehicle, of a dial having a scale, a speed index-hand and a curve index-hand movable over said scale, means operatively connected with the road-wheels and the speed index-hand for causing said speed index-hand to shift to indicate the vehicle speed on said scale, and means operatively connected with the curve index-hand and the steering-device for causing said curve index-hand to shift over said scale to indicate the critical speed of the vehicle for each position of the steering device, said dial being provided with an additional scale indicating the steering radius at which the non-skidding vehicle moves for each position of the steering device and curve index-hand.

5. In an indicator arrangement of the character described the combination, with the road-wheels and the steering device of a motor-vehicle, of a dial having a scale, a speed index-hand and a curve index-hand movable over said scale, means operatively connected with the road-wheels and the speed index-hand for causing said speed index-hand to shift to indicate the vehicle speed on said scale, and means operatively connected with the curve index-hand and the steering-device for causing said curve index-hand to shift over said scale to indicate the critical speed of the vehicle for each position of the steering device, said dial being provided with three additional scales indicating the steering radius of the curve in which the non-skidding vehicle moves, the middle speed and the low speed for the vehicle when steered in a curve, for each position of the steering device and curve index-hand.

6. In an indicator arrangement of the character described the combination, with the road wheels and steering device of a motor-vehicle of, a speed indicator of the centrifugal type for indicating the correct speed of the vehicle and having a combined dial provided with a scale, a speed index-hand movable over said scale, and means operated from said road wheels for shifting said speed index-hand; a curve index-hand also movable over said scale, and means connecting the curve index-hand with the steering device for causing said index-hand to shift to indicate on said scale the critical speed of said vehicle for each position of the steering device, whereby when both hands have the same position on said combined dial, they show danger speed and the vehicle is moving at critical speed.

7. In a speed-indicator arrangement for a motor-vehicle without a middle road-wheel, the combination with the road-wheels of the vehicle, of a differential gear, and a speed-indicator having a dial with a scale and an index-hand moving over said scale, the two side-wheels of the differential gear receiving by some means motion, one from the right-hand road-wheel and the other from the left-hand road-wheel of the vehicle, while the middle wheel of said differential gear transmits by some means motion to the speed-indicator, and thereby causing said index-hand to shift to indicate on the scale of said dial always the correct speed of the vehicle, whether it moves in a straight line or in a curve to the right or to the left hand side.

8. In an indicator arrangement of the character described, the combination with the road-wheels and steering device of a motor-vehicle having no middle road-wheel, of a differential gear, a curve and danger indicator, and a speed-indicator of the centrifugal type, the latter two having a combined dial with four scales and a speed index-hand and a curve index-hand moving over said dial, the two side-wheels of the differential gear receiving by some means motion, one from the right-hand road-wheel and the other from the left-hand road-wheel of the vehicle, while the middle wheel of said differential gear transmits by some means motion to the speed indicator, and thereby causing said speed index-hand to shift to indicate always the correct vehicle speed on the first scale of the combined dial, whether the vehicle moves in a straight line or in a curve to the right or to the left, means connecting the steering device with the curve index-hand for causing the latter to shift to indicate on said first scale of the combined dial the critical speed of the vehicle for each position of the steering device, and on the three other scales of said dial, the steering radius of the curve in which the non-skidding vehicle moves the middle speed and the low speed of the vehicle, when the latter is steered in a curve, whereby when the two index-hands of the combined dial have the same position on it, they show danger speed and the vehicle is moving at critical speed.

In testimony, that I claim the foregoing as my invention, I have signed my name in presence of two subscribing witnesses.

MATHIAS J. KLEIN.

Witnesses:
  PAUL GOEPEL,
  HENRY J. SUHRBIER.